(12) United States Patent
Shuto et al.

(10) Patent No.: US 7,269,748 B2
(45) Date of Patent: Sep. 11, 2007

(54) SYSTEM FOR PREVENTING ERRORS UPON EJECTION OF A MEMORY CARD FROM A SLOT

(75) Inventors: Shinichi Shuto, Kokubunji (JP); Takayuki Tamura, Higashiyamato (JP); Chiaki Kumahara, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 318 days.

(21) Appl. No.: 10/712,996

(22) Filed: Nov. 17, 2003

(65) Prior Publication Data

US 2004/0193928 A1    Sep. 30, 2004

(30) Foreign Application Priority Data

Mar. 28, 2003    (JP)    ............... 2003-089691

(51) Int. Cl.
*G06F 1/00*    (2006.01)
*G06F 13/00*    (2006.01)
*H05K 7/10*    (2006.01)

(52) U.S. Cl. ....................... 713/300; 710/302

(58) Field of Classification Search ................ 713/300; 710/302
See application file for complete search history.

(56) References Cited

U.S. PATENT DOCUMENTS

| 5,745,912 | A | * | 4/1998 | Konishi et al. ............. 713/600 |
| 5,805,473 | A | * | 9/1998 | Hadderman .................. 713/321 |
| 5,862,393 | A | * | 1/1999 | Davis .......................... 713/300 |
| 6,041,375 | A | * | 3/2000 | Bass et al. ................... 710/302 |
| 6,062,480 | A | * | 5/2000 | Evoy ............................ 235/492 |
| 6,724,678 | B2 | * | 4/2004 | Yoshimura .................. 365/229 |

FOREIGN PATENT DOCUMENTS

JP    2000-99215    4/2000

\* cited by examiner

*Primary Examiner*—Chun Cao
*Assistant Examiner*—Ji H Bae
(74) *Attorney, Agent, or Firm*—Miles & Stockbridge P.C.

(57) ABSTRACT

Disclosed herewith is a semiconductor processing system such as a card type electronic device, which can easily cope with an error caused by power shutoff that occurs when the card is ejected. The semiconductor processing system is provided with an interface control circuit and a processing circuit and receives operation power from an external device such as a card slot when it is inserted therein. According to a first aspect of the present invention for coping with an error caused by power shutoff that occurs when the card is ejected, the interface control circuit, when the card is ejected from the card slot, detects a potential change to occur at a first external terminal to be disconnected from a predetermined terminal of the card slot before the power supply from the card slot is shut off, then instructs the processing circuit that is active to perform an ending processing. The semiconductor processing system can end the processing by itself before the power supply stops completely.

20 Claims, 6 Drawing Sheets

SYSTEM FOR PREVENTING ERRORS UPON EJECTION OF A MEMORY CARD FROM A SLOT

BACKGROUND OF THE INVENTION

The present invention relates to a semiconductor processing system such as a card type electronic device represented by a flash memory card conforming to the standard of the ATA (AT Attachment) card or CF (Compact Flash) card, more particularly to a technique usable effectively for preventing data damages to be caused by ejection of the semiconductor processing system undesirably or for enabling data recovery during an operation.

A pulled-down terminal in an ATA card and a pulled-up terminal in a card slot that correspond to each other are usually used to detect whether or not the ATA card is inserted/ejected in/from its card slot. If an ATA card is inserted in the card slot and the corresponding terminals are connected to each other, the terminal in the card slot is grounded, then an interface circuit in the card slot, which monitors the terminal, detects the inserted card, thereby beginning supply of an operation power to the card. When the card is ejected, the corresponding terminals are disconnected, then the interface circuit in the card slot detects the supply voltage at the terminal in the card slot, thereby detecting the ejection of the card. The interface circuit in the card slot, when detecting such card ejection, stops the operation power supply to the card (refer to the patent document 1).

[Patent Document 1]

Japanese Unexamined Patent Publication 2000-99215 (FIG. 5)

However, the above conventional technique does not consider the problem that might occur in the card due to the stop of the power supply when the card is ejected. According to an examination by the inventor of the present invention, if a flash memory card is ejected from the card slot during a write operation, the operation power supply to the card stops and the supply voltage drops. And, if data is kept written in the memory in such a state, the memory might be affected adversely by the write operation. For example, if the operation power supply stops just after an erasure operation is performed just before a write operation in non-volatile memories, some of the non-volatile memory cells might be left over as over-erased ones. An over-erased memory cell means a memory cell in which the threshold voltage is changed over a predetermined threshold voltage range, although the threshold voltage of the erased memory cell should be included in the range. For example, if the erasure state threshold voltage range is set at the low voltage side, the threshold voltage of the memory cell becomes lower than the threshold voltage range and comes to have a negative voltage. In a memory cell of which threshold voltage is negative, the memory cell is turned on even when a non-selection voltage (ex., 0V) is applied to its word line, thereby a current flows in the channel. If such an over-erased memory cell is turned on normally, another memory cell that shares a bit line with the over-erased memory cell comes to malfunction. To prevent such a problem, some countermeasures are taken as follows, for example. It is avoided to leave such over-erased memory cells over, recovery and relief processings are prepared for generation of over-erased memory cells, or a circuit that might malfunction is permitted to be isolated when it malfunctions.

In order to enable the above countermeasures, the following measures are also effective; (1) preparing a spare battery, (2) using a large capacity capacitor, (3) dualizing the data area, and (4) cautioning the user fully about the trouble occurrence. In (1), however, a small card cannot have space for such a spare battery. If the card has such space, the card cost increases. The large capacity capacitor in (2) also has the same problem as that of (1). In (3), the data management method becomes complicated. In (4), it is impossible to caution every user fully about the problem occurrence.

Under such circumstances, it is an object of the present invention to provide a semiconductor processing system represented by a card type electronic device, which can solve easily the above conventional problem caused by power shutoff that occurs when the card is ejected.

It is another object of the present invention to provide a semiconductor processing system represented by a card type electronic device capable of taking countermeasures in accordance with the subject memory/data management method with respect to a problem caused by power shutoff that occurs when the card is ejected.

These and other objects, as well as novel features of the present invention will become more apparent by referring to the following description and appended drawings.

SUMMARY OF THE INVENTION

The typical aspects of the present invention to be disclosed in this specification will be summarized as follows.

[1] The semiconductor processing system, for example, a card type electronic device (1), is provided with an interface control circuit (4) and a processing circuit (5) and inserted in, for example, a card slot (11) to receive an operation power supply therefrom. According to one aspect of the present invention for solving a problem caused by power shutoff that occurs when the card is ejected from the card slot, the interface control circuit, when the card is ejected from the card slot, detects a potential change to occur at a first external terminal (H1, Fvs2) to be disconnected from a predetermined terminal (P1, Pvs2) of the card slot before the power supply from the card slot stops. The control circuit then instructs the processing circuit that is active to begin an ending processing. Consequently, the card type electronic device can perform the ending processing by itself before the power supply is shut off completely.

According to the second aspect of the present invention, the interface control circuit, when the card is ejected from the card slot, detects a potential change to occur at the first external terminal to be disconnected from a predetermined terminal of the card slot before the power supply to the card from the card slot is shut off. The control circuit then retains a flag that denotes the power shutoff in the non-volatile latch circuit (25). Consequently, the interface control circuit can check the flag after the memory card is powered to check whether or not any power shutoff occurs. If power shutoff is detected, the control circuit decides the processing circuit to be abnormal and perform a recovery processing for the processing circuit as needed.

According to the third aspect of the present invention, the interface control circuit, when the card is ejected from the card slot, detects a potential change that occurs at the first external terminal to be disconnected from a predetermined terminal of the card slot before the power supply from the card slot stops. The control circuit then starts up a power supply circuit, for example, a charge pump circuit (30) to supplement the operation power of the processing circuit. Consequently, the time required until the power supply is shut off completely can be extended and the control circuit can complete necessary processings easily in the meantime. The power supply circuit such as a charge pump circuit may be any of a built-in one in the processing circuit and a dedicated one added newly.

The card type electronic device may be provided with a monitoring terminal (H2) connected to the first external terminal so as to report the host system as soon as possible about whether or not the processing circuit that is active is instructed to begin an ending processing. The monitoring terminal (H2) is a terminal that enables the host system to monitor potential changes to occur at the first external terminal.

[2] According to the first aspect of the above power shutoff detection, the first external terminal (H1) functions as a reset terminal that receives a first voltage after a reset instruction is canceled. The reset terminal is connected to a second external terminal (Hvd) through a resistance element (7) and the second external terminal (Hvd) receives a second voltage from the card slot. The polarity of the second voltage is opposite to that of the first voltage.

According to the second aspect of the above power shutoff detection, the first external terminal receives the first voltage when the processing circuit is active and the first external circuit is connected to the second external terminal through a resistance element and the second external terminal receives the second voltage from the card slot. The polarity of the second external terminal is opposite of that of the first external terminal. The second external terminal can denote indirectly, for example, that the processing circuit is active.

According to both of the first and second aspects of the power shutoff detection, the first voltage is a circuit ground voltage (GND) and the second voltage is a supply voltage (Vdd). The second external terminal is an external power supply terminal (Hvd). They may be reversed in function respectively. In other words, it is possible that the first voltage is a supply voltage (Vdd), the second voltage is a circuit ground voltage (GND), and the second external terminal is a ground source terminal (Hvs).

According to the third aspect of the above power shutoff detection, the first external terminal is one (Fvs2) of a plurality of ground terminals (Fvs1 and Fvs2) and the ground terminal (Fvs2) is connected to the power supply terminal (Fvd) through a resistance element (7).

In any of the first to third aspects of the above power-off detection, the power supply terminal is disconnected after the first external terminal is disconnected from the terminal for correspondence in the card slot.

(3) If the present invention applies to a non-volatile memory card, the processing circuit comes to be a non-volatile memory (5) enabling information to be erased/written therefrom/therein electrically and the interface control circuit functions as a control circuit (4) for controlling both of the external interface and the non-volatile memory.

At this time, the ending processing is made to adjust the threshold voltages of non-volatile memory cells to be set in a predetermined threshold voltage range during an erasure/write operation, for example. Consequently, no over-erased memory cell is left over even when power shutoff occurs undesirably during a data write operation.

Another example of the ending processing is to set an identification flag that can identify a non-volatile memory cell block (a unit for erasing/writing) in which an erasure/write operation is performed, then storing the flag in the flash memory. Consequently, the interface control circuit checks the identification flag set in the non-volatile memory after the flash memory is powered so as to check whether or not there is any memory block in which power shutoff occurs during the erasure/write operation. If power shutoff occurs in any memory block, the memory block may be replaced with another according to the data management method employed for the memory so as to avoid trouble to be caused by excessive erasure.

Together with setting of the identification flag, the erasure/write completing processing may be performed for the subject non-volatile memory cells.

(4) According to another aspect of the present invention, the semiconductor processing system such as a card type electronic device is provided with a plurality of external terminals that can be attached/detached to/from an external device such as a corresponding terminal in the card slot, a first processing circuit (4) connected to the plurality of external terminals, a second processing circuit (5) controlled by the first processing circuit, and a resistance element (7) used for the connection between the first and second external terminals included in the plurality of external terminals. The first external terminal receives the first voltage when the second processing circuit is active. The second external terminal receives the second voltage. The first processing circuit, when the card is ejected from the card slot, detects a voltage change from the first voltage to the second voltage at the first external terminal before the power supply from the card slot stops, then performs a processing such as an ending processing in response to the detected voltage change.

The first external terminal is, for example, a reset terminal that receives the first voltage after a reset instruction is canceled.

The second processing circuit is, for example, a non-volatile memory enabling information to be erased/written therefrom/therein electrically and the first processing circuit controls both of the external interface and the non-volatile memory.

According to still another aspect of the present invention, the semiconductor processing system such as a card type electronic device is provided with a plurality of external terminals that can be attached/detached to/from their corresponding terminals of an external device such as a card slot, a first processing circuit connected to the plurality of external terminals, a second processing circuit controlled by the first processing circuit, and a resistance element used for the connection between the first and second external terminals included in the plurality of external terminals. The first external terminal is one of a plurality of ground terminals. The second external terminal is a power supply terminal. The first processing circuit detects a voltage change from the ground voltage from the supply voltage of the circuit at the first external terminal when the card is ejected from the card slot before the power supply from the card slot stops, then performs a processing in response to the detected voltage change. For example, the first external terminal is disposed so as to be disconnected earlier from its corresponding terminal in the card slot than other ground terminals when the card is ejected from the card slot.

DETAILED DESCRIPTION OF THE PREFERRED EMBODIMENT

Figure 1:
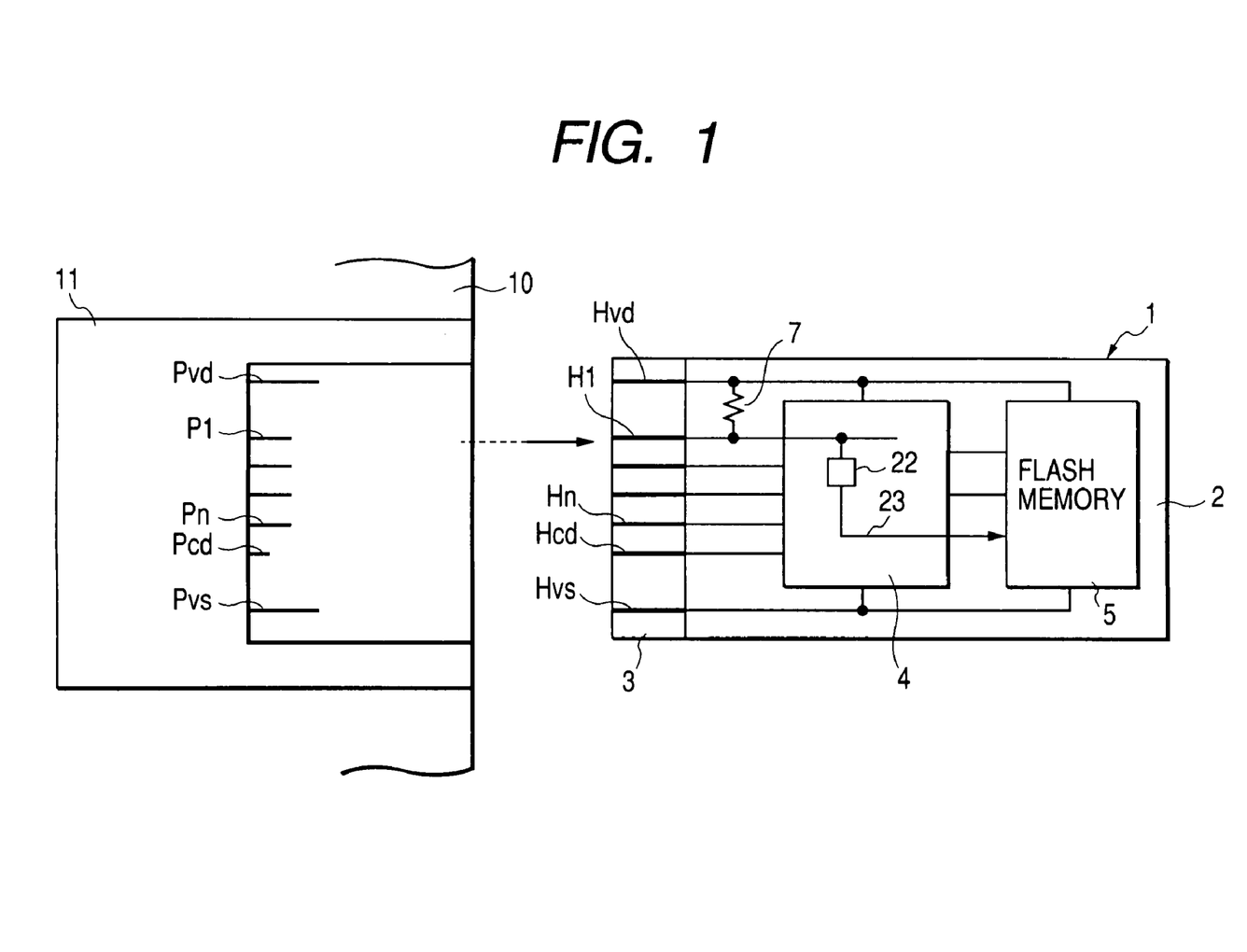
FIG. 1 is a schematic block diagram that includes a flash memory card, which is an example of a semiconductor processing system of the present invention, as well as a card slot.

FIG. 1 shows a flash memory card, which is an example of the semiconductor processing system of the present invention. The flash memory card shown in FIG. 1 is a kind of PC card conforming to the PCMCIA (Personal Computer Memory Card International Association) standard.

The flash memory card 1 is configured by an interface terminal block 3 provided on a card substrate 2, a controller 4, and a flash memory 5, which is a kind of non-volatile memory enabling information to be erased/written therefrom/therein electrically. The interface terminal block 3 is inserted/ejected in/from a card slot 11 of a card host system 10 such as a personal computer. The type and physical configuration of the interface terminal are decided in accordance with the standard to which the memory card confirms. For example, the interface terminal block 3 is provided with a power supply terminal Hvd, a ground terminal Hvs, a card detection terminal Hcd, and a plurality of signal terminals H1 to Hn. A clock signal terminal is included in the signal terminals H1 to Hn. The card slot 11 is provided with a power supply terminal Pvd, a ground terminal Pvs, a card detection terminal Pcd, and a plurality of signal terminals P1 to Pn corresponding to the above terminals. For example, the interface terminals Pvd, Pvs, Pcd, and P1 to Pn of the card slot 11 are pin terminals while the interface terminals Hvd, Hvs, Hcd, and H1 to Hn are hole terminals into which the pin terminals are inserted. The tips of the hole interface terminals Hvd, Hvs, Hcd, and H1 to Hn are aligned. The pin interface terminals Pvd, Pvs, Pcd, and P1 to Pn have tips and the tips of the power supply terminals Pvd and Pvs are protruded and longer than those of the others. The signal terminals P1 to Pn and the card detect terminal Pcd are formed shorter sequentially.

The interface terminals Pvd, Pvs, Pcd, and P1 to Pn of the card slot 11 are connected to a card controller (not shown) and used to detect insertion/ejection of a card, control supply/stop of a power in accordance with the detection result of an inserted/ejected card, and control the signal interfaces. Although not shown specially, the card detect terminal Hcd in each memory card is pulled down and the card detect terminal Pcd in the card slot is pulled up. If the card 1 is inserted in the card slot 11 and the terminals Hcd and Pcd are connected to each other, the terminal Pcd of the card slot 11 is set at a ground voltage GND of the circuit, then the interface circuit provided in the card slot 11 for monitoring the corresponding terminal detects an inserted card, then begins supply of an operation power to the memory card 1. When the memory card 1 is ejected, the card detect terminals Pcd and Hcd are disconnected from each other, thereby the interface circuit of the card slot 11 detects the supply voltage set at the terminal and the memory card ejection. The interface circuit of the card slot 11 that has detected the card ejection stops supply of the operation power to the card.

In the memory card 1, the controller 4 and the flash memory 5 are connected to the power supply terminal Hvd and the ground terminal Hvs respectively so as to receive an operation power from the card slot 11. The controller 4 controls the interface with the host system and the interface with the flash memory 5.

The flash memory 5 is provided with a memory mat in which many non-volatile memory cells, each of which enables information to be erased/written therefrom/therein electrically, are disposed like a matrix. Although not limited specially, each of the non-volatile memory cells has a stacked gate structure provided with a source (connected to a source line), a drain (connected to a bit line), a channel, as well as a pair of a floating gate and a control gate (connected to a word line respectively) stacked on the channel so as to be insulated from each other. For example, information is erased from a memory cell by moving electrons from the floating gate into the well region with a negative high voltage applied to, for example, the connected word line while a positive high voltage is applied to the word line to charge hot carriers into the floating gate from the well region to write data in the memory cell. The threshold voltage of the memory cell differs between erasing and writing processings at a view from the control gate. And, according to this difference, information is recorded in the memory cell.

The controller 4 controls accesses to the flash memory 5, which is regarded as a file memory compatible with hard disks at that connection. For example, the controller 4 manages addresses so as to access the data area in the flash memory 5 in sectors and controls allocation of alternative sectors that will take the places of defective sectors. The controller 4 uses physical addresses to control the access to the flash memory 5 for erasing, writing, and reading information from/in/from the flash memory.

Next, a description will be made for a configuration of the memory card 1 that detects its ejection from the card slot 11 by itself. In FIG. 1, the voltage of the signal terminal H1 is pulled up to that of the power supply terminal Hvd in the resistance element 7. The signal terminal H1, when it is connected to the corresponding terminal P1 of the card host system 10, functions as a reset terminal to be set at the ground voltage GND after a reset instruction from the card host system 10 is canceled. The reset terminal P1 is an output terminal and the card host system 10, when detecting a inserted memory card 1, drives the voltage of the reset terminal P1 into high level pulses to initialize the controller 4. After that, the reset terminal P1 keeps the low level. In that connection, the reset terminal P1 is assumed as one of the signals driven into the low level in response to an instruction from the controller 4 while the flash memory 5 is in the busy state in which it erases/writes information therefrom/therein.

Figure 2:
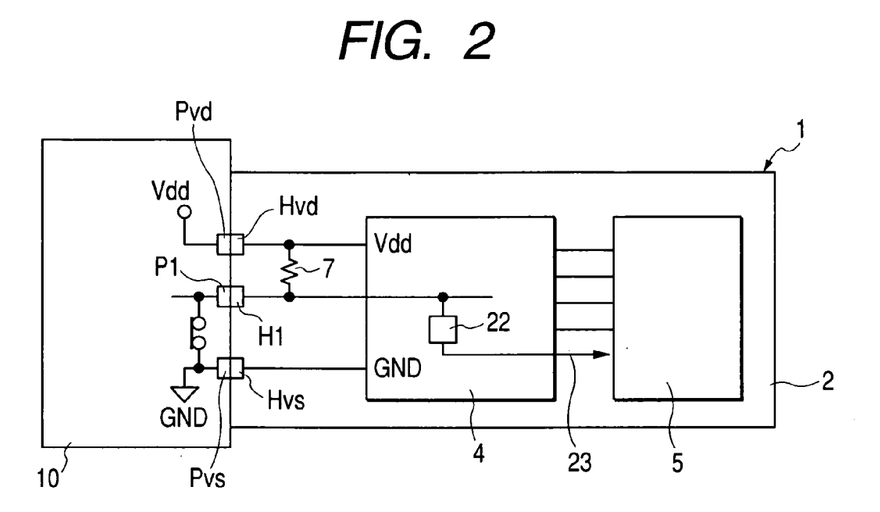
FIG. 2 is a schematic block diagram of a memory card connected to a card host system.

FIG. 2 shows how the memory card 1 is inserted in the card host system 10. In FIG. 2, a switch is disposed between the reset terminal P1 and the ground terminal Pvs. This switch is a circuit element to be turned on after a reset instruction is canceled so as to drive the level of the reset terminal P1 into Low.

Figure 3:
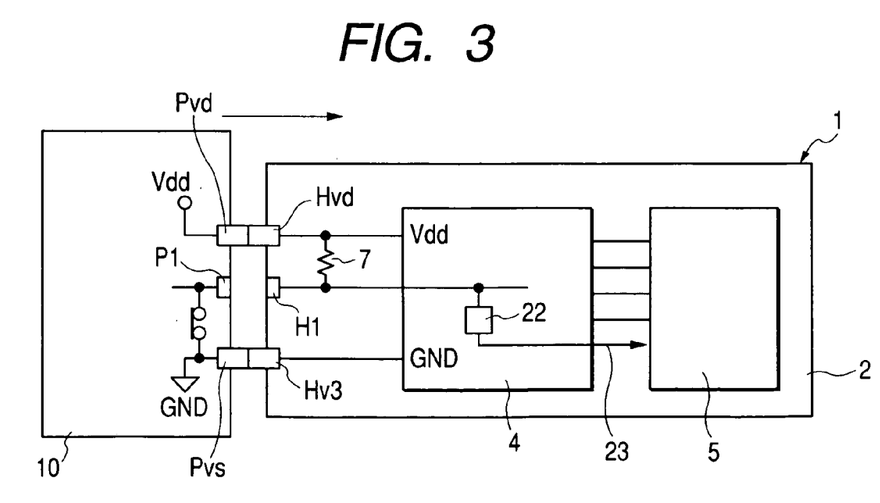
FIG. 3 is a schematic block diagram for denoting a transition state in which a power supply terminal is kept connected while a reset terminal is disconnected when the memory card is disconnected from the card host system.

In the state shown in FIG. 2, the reset terminal H1 keeps the ground voltage GND. If an attempt is made to eject the memory card from the card host system 10, the card detect terminal Hcd is disconnected from the corresponding terminal Pcd of the card slot 11, thereby the card controller of the card host system 10 stops supply of the operation power to the terminal Pvd. Even when the card controller stops supply of the operation power to the terminal Pvd such way, it takes some time until the supply voltages of the terminals Pvd and Hvd actually drop due to the parasitic capacitor component of the power supply system of the card host system 10. In the meantime, the reset terminal H1 is disconnected from the signal terminal P1 of the card host system 10. As a result, the reset terminal H1 comes to receive the supply voltage Vdd through the resistance element 7 so that the level of the terminal H1 is driven into High. The high level of the reset terminal H1 is retained in the latch circuit 22 and the latch circuit 22 outputs a signal 23 that instructs the flash memory 5 to execute an ending processing. After that, it takes some time until the memory card 1 is ejected from the card slot 11, thereby the terminals Hvd and Hvs of the memory card 11 are disconnected from the terminals Pvd and Pvs of the card slot 11. In the meantime, the flash memory 5 completes the ending processing in response to the above instruction.

The ending processing is, for example, adjusting the threshold voltages of non-volatile memory cells so as to be set in a predetermined threshold voltage range (also referred to as a light write processing) during an erasure/write processing. At this time, the instruction signal 23 for the ending processing is a reset signal (reset) issued from the flash memory 5. The flash memory 5, if a reset signal is asserted during an erasure/write processing, executes such a light write processing. For example, if an erasure/write processing is executed for each word line connected to memory cells in a flash memory, such a light write processing is done for memory cells that are over-erased or almost over-erased. The light write processing means a write processing executed at a shorter application time of a high write voltage so as to raise the negative threshold voltage of the target memory cells up to a positive voltage. If a write voltage is applied to a word line while an erasure/write processing is made for each word line, each memory cell having a negative threshold voltage comes to have a potential difference larger than that of the memory cell having a positive threshold voltage. The potential difference is applied to the charge accumulation layer of each memory cell regardless of the negative/positive threshold voltage. Consequently, information is written earlier in the memory cell having the negative threshold voltage than the memory cell having the positive threshold voltage. And, because the object of the light write processing is to change the threshold voltage of each over-erased memory cell, more particularly to change the negative threshold voltage of each memory cell to a positive threshold voltage, the write voltage application time for the memory cell can be further shortened than that for normal write processings. Consequently, the flash memory card 1 can cope with an undesirable power shutoff that occurs during a data write processing by itself so as not to leave over-erased memory cells before the power supply thereto is shut off completely.

The card controller also executes another ending processing that sets an identification flag that can identify a block of non-volatile memory cells in/from which information is being written/erased and stores the flag. The identification flag may be stored in any of its dedicated area provided in the flash memory and the sector management area. If the flag is stored in the sector management area, it must be assured that the flag can be read when the flash memory 5 is powered. Preferably, the flag should be stored in the dedicated area so as to improve the reliability. The instruction for this ending processing may be a reset signal (reset) issued to the flash memory 5. If an erasure/write processing is being executed when this reset signal is asserted, it is just required to perform an ending processing so as to store the identification flag. Consequently, the controller 4 checks the identification flag in the flash memory 5 when the flash memory 5 is powered so as to check whether or not there is any memory block in which power shutoff occurs during an erasure/write processing. If such a memory block is detected, the memory block may be replaced with another in accordance with the employed data management method so as not to make the over-erasure cause another problem.

The identification flag may also be set when a completion processing is performed for non-volatile memory cells during an erasure/write processing. This makes it possible to reduce the memory cell replacement frequency, thereby suppressing the consumption of alternative sectors.

Figure 4:
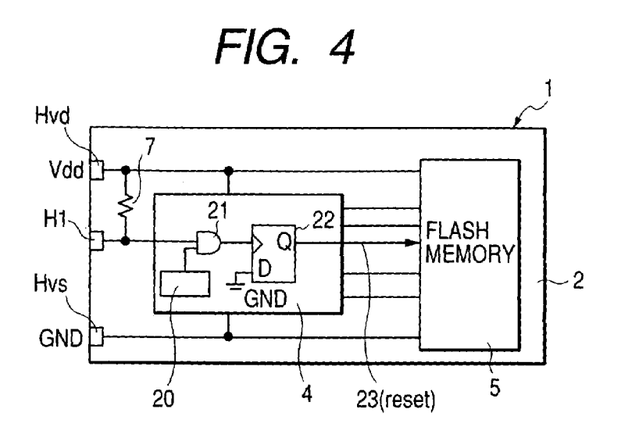
FIG. 4 is a schematic block diagram of a memory card, in which another route of an instruction for an ending processing is denoted.

FIG. 4 shows another example of the instruction route for the ending processing. In that connection, the controller 4 is provided with a microcomputer 20 for controlling both interface and memory. The control register (not shown) of the microcomputer 20 has one bit for setting whether to validate the ejected card detecting function. This setting bit, when a logical value "1" is set therein, validates the ejected card detecting function. This valid bit signal is inputted to a 2-input logical product (AND) gate 21 together with the signal from the terminal H1 and the clock terminal of the D-type latch circuit 22 receives the signal output. The data terminal D of the D-type latch circuit 22 is connected to the ground terminal Vss and the latch circuit 22 outputs the reset signal 23 (reset) to the flash memory 5 through the output terminal Q. The flash memory card 1 is also used to assure perfect compatibility with a hard disk so that the card cannot be inserted/ejected from the card slot 11 freely. In that connection, no instruction is needed for the ending processing. It is just required at that time to set the logical value "0" fixedly for the setting bit.

Figure 5:
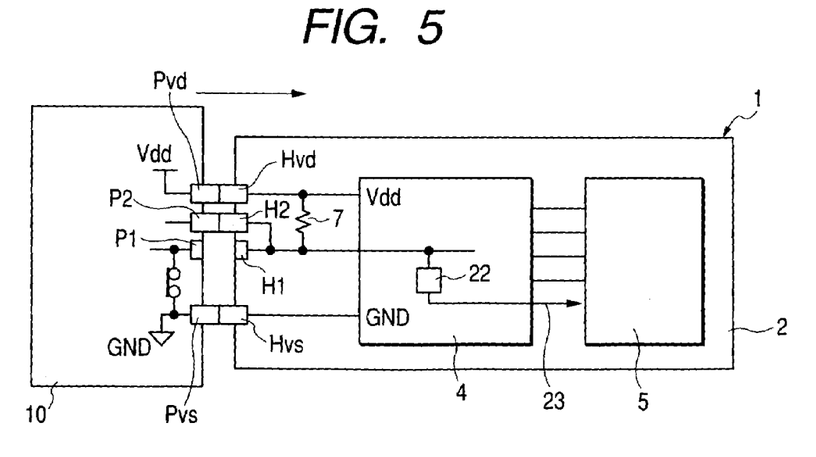
FIG. 5 is a schematic block diagram of a memory card provided with a monitoring terminal for monitoring an ending processing.

FIG. 5 shows a case in which the flash memory 5 is provided with a monitoring terminal for the ending processing. In order to quickly notify the card host system 10 of whether or not the ending processing is instructed to the flash memory 5, the flash memory 5 is provided with a monitoring terminal H2 to be connected to the external terminal H1. The monitoring terminal H2 enables the card host system 10 to monitor potential changes to occur at the external terminal H1. Consequently, the card host system 10 can save write data so as to write the data again when power shutoff occurs. In addition, it is possible to call the user's attention to the inhibition of card ejection during an erasure/write processing.

Figure 6:
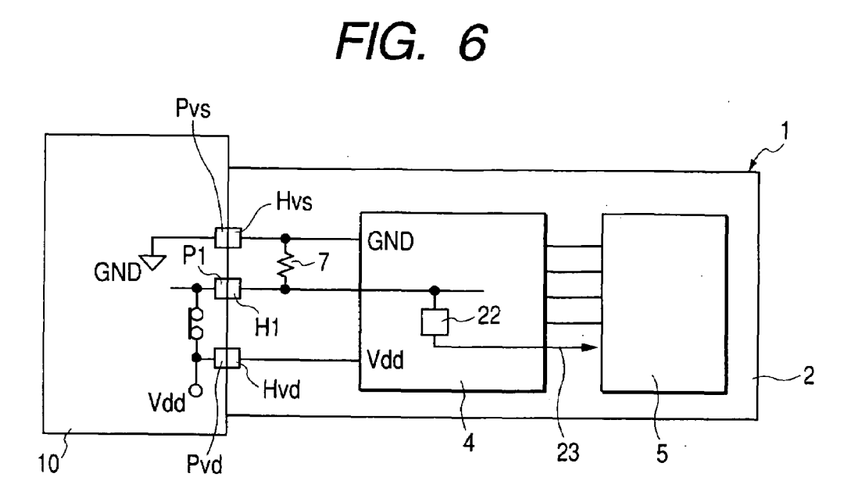
FIG. 6 is a schematic block diagram of a memory card having a signal terminal H1 of which polarity differs from that shown in FIG. 1.
Figure 7:
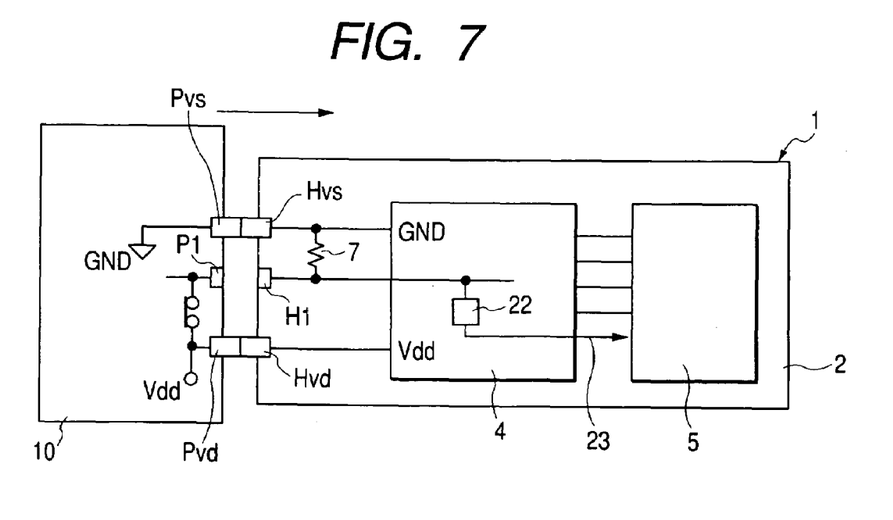
FIG. 7 is a schematic block diagram for denoting a transition state in which the power supply terminal is kept connected while the reset terminal is disconnected when the memory card shown in FIG. 6 is ejected from the card host device.

Next, a description will be made for another configuration for detecting card ejection from the card slot 11. In the example shown in FIG. 6, the voltage of the signal terminal H1 is pulled down to that of the ground terminal Hvs in the resistance element 7. In this case, however, the reset signal RST supplied to the signal terminal H1 is a low level pulse that instructs a reset processing, then the reset signal RST is kept at the high level. FIG. 6 shows the memory card 1 inserted in the card host system 10. In that state, the signal terminal H1 keeps the supply voltage Vdd. If an attempt is made to eject the memory card 1 from the card host system 10 at that time as shown in FIG. 7, the card detect terminal Hcd is disconnected from the corresponding terminal Pcd of the card slot 11, then the card controller 4 of the card host system 10 stops supply of the operation power to the terminal Pvd. However, even when the operation power supply stops in such a way, it takes some time until the voltages of the terminals Pvd and Hvd drop due to the parasitic capacity of the power supply system of the card host system 10. In the meantime, the signal terminal H1 is disconnected from the signal terminal P1 of the card host system 10. Consequently, the ground voltage GND is applied to the signal terminal H1 through the resistance element 7, thereby the level of the signal terminal H1 is changed to Low. The low level of the terminal H1 is retained in the latch circuit 22 and the latch circuit 22 outputs a signal 23 to instruct the flash memory 5 to execute an ending processing. After that, it takes some time until the memory card 1 is ejected from the card slot 11 and the terminals Pvd and Pvs of the card slot 11 are disconnected from the card terminals Hvd and Hvs. In the meantime, the flash memory 5 completes the ending processing in response to the above instruction.

Figure 8:
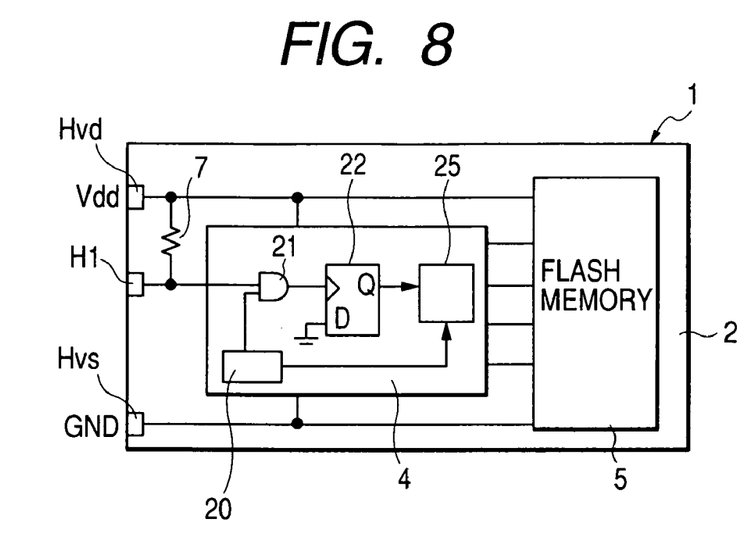
FIG. 8 is another schematic block diagram of the memory card provided with means for detecting its ejection from the card slot.

Next, a description will be made for still another configuration for detecting card ejection from the card slot 11. In the example shown in FIG. 8, a potential change occurs at the signal terminal H1 when the card is ejected from the card slot just like in the above example. At this time, the controller 4 stores the flag that denotes power shutoff in response to the potential change. The controller 4 can store the flag in the non-volatile latch circuit 25 provided in itself in that case, not in the flash memory 5. The non-volatile latch circuit 25 is composed of non-volatile memory cells used as bits just like the flash memory 5. If the level of the signal terminal H1 is changed while an attempt is made to eject the memory card 1 from the card host system 10, the controller 4 stores the flag that denotes power shutoff occurrence together with a sector address in the non-volatile latch circuit 25. When the flash memory 5 is powered, the controller 4 checks the flag to check whether or not any power shutoff has occurred. And, if power shutoff occurs, the controller 5 can decide the power-off sector to be abnormal and replace the sector with another as needed.

Figure 9:
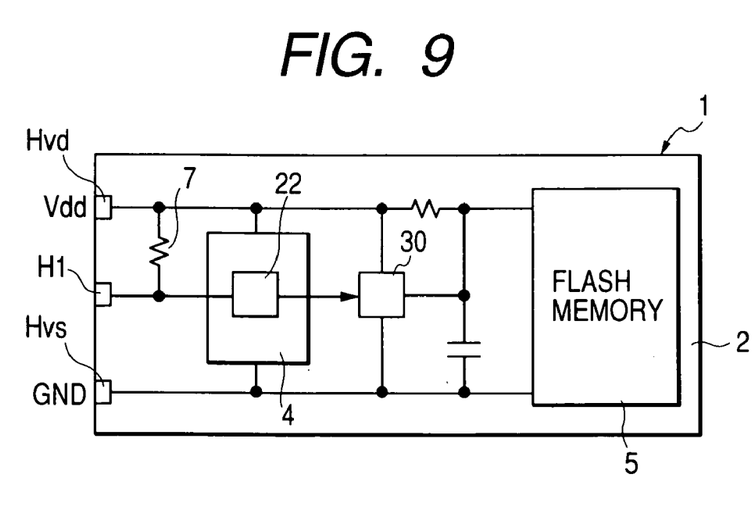
FIG. 9 is still another schematic block diagram of the memory card provided with means for detecting its ejection from the card slot.

Next, a description will be made for still another configuration for detecting card ejection from the card slot 11. In the example shown in FIG. 9, the potential change at the signal terminal H1 is detected just like in the above example when the memory card 1 is ejected from the card slot 11. The controller 4 then starts up the charge pump circuit 30 in response to the detected potential change to supply the operation power of the flash memory 5. And, as described above, the time required until the power supply stops completely can be extended, allowing the controller to complete the necessary processings. The charge pump circuit 30 may be any of a built-in one in the flash memory 5 or a dedicated one added newly to the flash memory 5.

Figure 10:
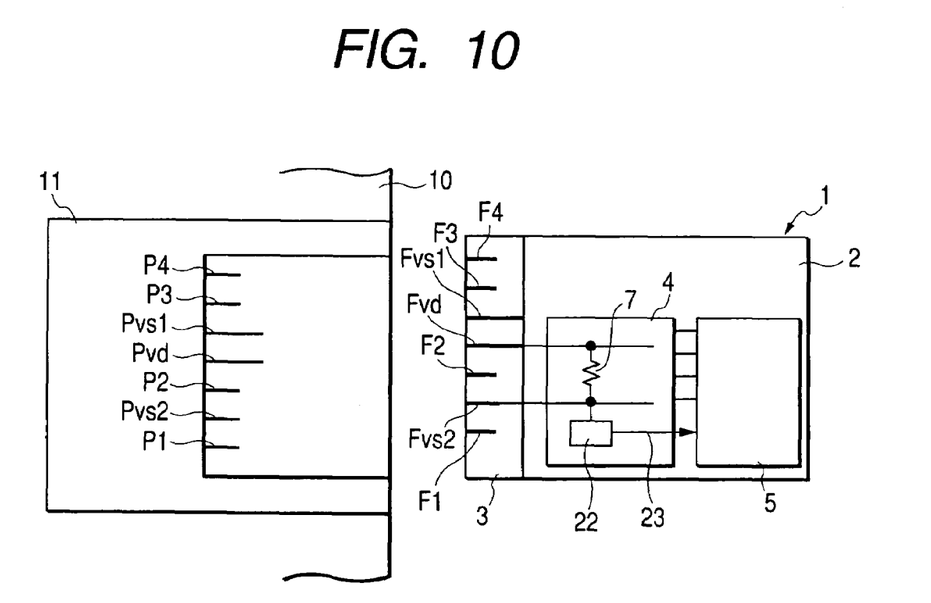
FIG. 10 is a schematic block diagram of a flash memory card conforming to a card standard that is different from the standard of the card shown in FIG. 1, the flash memory card being another example of the semiconductor processing system of the present invention.

FIG. 10 shows a flash memory card, which is another example of the card type electronic device of the present invention. The flash memory card shown in FIG. 10 conforms to, for example, the MMC (Multi Medium Card) standard.

The flash memory card 1 is composed of an interface terminal block 3 formed on a card substrate 2, a controller 4, and a flash memory 5, which is a kind of non-volatile memory enabling information to be erased/written therefrom/therein electrically. The interface terminal block 3 is inserted/ejected in/from the card slot 11 of the card host system 10 such as a personal computer. The type and physical configuration of the interface terminal are decided in accordance with the standard to which the memory card conforms. For example, the interface terminal block 3 is provided with a power supply terminal Fvd, a ground terminals Fvs1 and Fvs2, a card detection terminal Fcd, and a plurality of signal terminals F1 to F4. The card slot 11 is provided with a power supply terminal Pvd, ground terminals Pvs1 and Pvs2, and a plurality of signal terminals P1 to Pn corresponding to the above terminals. For example, the interface terminals Pvd, Pvs1, Pvs2, and P1 to Pn of the card slot 11 are pin terminals while the interface terminals Fvd, Fvs1, Fvs2, and F1 to Fn are flat terminals on which the pin terminals come in contact. The connection/disconnection of the flat power supply terminals Fvd, Fvs1, and Fvs2 to/from the power supply interface terminals Pvd, Pvs1, and Pvs2 are made earlier than the connection/disconnection of Fvd, Fvs1, Pvd, and Pvs1. In short, when the memory card 1 is inserted in the card slot 11, connection of Pvs1 and Pvd to Fvs1 and Fvd is made earlier than connection of Pvs2 to Fvs2. When the memory card 1 is ejected from the card slot 11, the connections are done in the reverse order; Pvs1 is disconnected from Fvs1 and Fvd after Pvs2 is disconnected from Fvs2. For example, the terminal Pvs2 is shorter than the terminals Pvd and Pvs1 by 1 mm.

The interface terminals Pvd, Pvs1, PVs2, and P1 to P4 of the card slot 11 are connected to a card controller (not shown). The card controller detects insertion/ejection of the card 1 and controls supply and stop of the power according to the detection result of insertion/ejection of the card 1, as well as the signal interfaces.

In the memory card 1, the controller 4 and the flash memory 5 are connected to the power supply terminal Fvd and the ground terminal Fvs to receive the operation power from the card slot 11 respectively. The controller 4 controls interfacing with both of the card host system 10 and the flash memory 5.

The flash memory 5 is provided with a memory mat in which many non-volatile memory cells, each of which enables information to be written/erased therein/therefrom electrically, are disposed like a matrix similarly to the above example. A high voltage is applied to each memory cell so that information is written/erased therein.

The controller 4 controls accesses to the flash memory 5 that is assumed as a file memory compatible with a hard disk. For example, the controller 4 manages addresses so as to enable accesses to the data area provided in the flash memory 5 in sectors and controls allocation of sectors that will take the places of defective sectors. Physical addresses are used to access the flash memory 5 to erase, write, and read information therefrom/therein.

Next, a description will be made for a configuration of the memory card 1 for detecting its own rejection from the card slot 11. In the example shown in FIG. 10, the voltage of the terminal Fvd is pulled up to that of the power supply terminal Fvs1 in the resistance element 7.

While the memory card 1 is inserted in the card host 11, the terminal Fvs1 keeps the ground voltage GND. If an attempt is made to eject the memory card 1 from the card host system 10, the terminal Fvs1 is disconnected from the signal terminal P1 of the card host system 10. Consequently, a supply voltage Vdd is applied to the signal terminal Fvs1 through the resistance element 7, thereby the level of the signal terminal Fvs1 is changed to High. The High level of the terminal Fvs1 is retained in the latch circuit 22 and the latch circuit 22 outputs a signal 23 to instruct the flash memory 5 to execute an ending processing. After that, it takes some time until the memory card 1 is ejected and the terminals Pvd and Pvs2 of the card slot 11 are disconnected from the terminals Fvd and Fvs2 of the memory card 1. In the meantime, the flash memory 5 completes the ending processing in response to the above instruction.

While the preferred embodiment of the present invention has been described, it is to be understood that modifications will be apparent to those skilled in the art without departing from the spirit of the invention.

For example, the non-volatile memory cell may have a split-gate structure provided with a source (connected to a source line), a drain (connected to a bit line), a channel, and a pair of a select gate (connected to a word line) and a memory gate (connected to a memory gate control line) formed on the channel so as to be insulated from each other. In addition to a threshold voltage difference, the non-volatile memory can employ a carrier trapping position difference with respect to such a charge trapping film as a silicon nitride film to store information therein. Furthermore, although the non-volatile memory cell of the present invention can store information consisting of only one bit, it may store information consisting of two or more bits.

If a card type electronic device is used as a flash memory card, the card standard may not be limited only to those described above; it may also use other various types of card standards.

The card type electronic device may not be a flash memory card; it may be any of an SRAM (Static Random Access Memory) card, a LAN (Local Area Network) card, a modem card, and a graphic card. In that connection, if the card includes a non-volatile memory device for storing control information, the memory device may be instructed to execute the ending processing as described above. The present invention may also apply to any card type electronic device that does not include a non-volatile memory. For example, if a communication card is ejected undesirably during a transmission/receiving processing, a power-off/receiving error code may be transmitted to the transmission source smooth the re-transmission processing.

As described above, the present invention may apply widely to various semiconductor processing systems such as card type electronic devices including removable media.

The typical effects to be obtained from the present invention disclosed in this specification are briefly described as follows.

Concretely, because the subject semiconductor processing system represented by a card type electronic device can detect by itself that it is ejected before the power supply thereto stops completely so as to cope with power shutoff. Consequently, any memory card can take a proper measure to cope with such power shutoff in accordance with the employed memory/data management method. This is why the present invention can provide a semiconductor processing system that does not require any of a spare battery and a large capacity capacitor, thereby the processing system is reduced in cost, size, and weight. The semiconductor processing system can also reduce errors to be caused by power shutoffs and improve the reliability.

What is claimed is:

1. A semiconductor processing system comprising an interface control circuit and a processing circuit, and attached to an external apparatus so as to receive an operation power supply therefrom, wherein said interface control circuit, when said system is removed from the external apparatus, detects a potential change that occurs at a first external terminal of said system which is disconnected from a predetermined terminal of the external apparatus before the power supply from the external apparatus is disconnected from a second external terminal of said system, then instructs the processing circuit that is active to perform an ending processing, and wherein the first external terminal is one of a plurality of ground terminals and said first external terminal is connected to a power supply terminal through a resistance element.

2. A semiconductor processing system comprising an interface control circuit and a processing circuit, and attached to an external apparatus so as to receive an operation power supply therefrom, wherein said interface control circuit, when said system is removed from the external apparatus, detects a potential change that occurs at a first external terminal of said system which is disconnected from a predetermined terminal of the external apparatus before the power supply from said external apparatus is disconnected from a second external terminal of said system, then stores a flag denoting an occurrence of the power supply shutoff, wherein said first external terminal is a reset terminal to be set at a first voltage after a reset instruction is completed, and wherein said reset terminal is coupled to the second external terminal provided in the semiconductor processing system through a resistance element while said second external terminal receives a second voltage from the external apparatus the polarity of said second voltage being opposite from that of said first voltage.

3. A semiconductor processing system comprising an interface control circuit and a processing circuit and attached to an external apparatus so as to receive an operation power supply therefrom, wherein said interface control circuit, when said system is removed from the external apparatus, detects a potential change that occurs at a first external terminal of said system which is disconnected from a predetermined terminal of the external apparatus before the power supply from the external apparatus is disconnected from a second external terminal of said system, then starts up a power supply circuit to supplement the operation power supply of the processing circuit, wherein said first external terminal receives a first voltage when the processing circuit is active and said first external terminal is coupled to said second external terminal provided in the semiconductor processing system through a resistance element, and wherein said second external terminal receives a second voltage from the external apparatus, the polarity of said second voltage being opposite from that of said first voltage.

4. The semiconductor processing system according to claim 1, wherein said system includes a monitoring terminal coupled to said first external terminal, and wherein the monitoring terminal enables the external apparatus to monitor said potential change that occurs at said first external terminal after said first external terminal is disconnected from the external apparatus.

5. The semiconductor processing system according to claim 2,
wherein said first voltage is a ground voltage and said second voltage is a supply voltage while said second external terminal is an external power supply terminal.

6. The semiconductor processing system according to claim 3,
wherein said first voltage is a supply voltage and said second voltage is a circuit ground voltage while said second external terminal is a ground source terminal.

7. The semiconductor processing system according to claim 1,
wherein said processing circuit includes a non-volatile memory enabling information to be written/erased therein/therefrom electrically; and
wherein said interface control circuit is a control circuit for controlling both of said external interface and said non-volatile memory.

8. The semiconductor processing system according to claim 7,
wherein said ending processing adjusts threshold voltages of non-volatile memory cells so as to be set in a predetermined threshold voltage range during an erasure/write processing.

9. The semiconductor processing system according to claim 7,
wherein said ending processing sets and stores an identification flag that can identify a block of non-volatile memory cells during an erasure/write processing.

10. The semiconductor processing system according to claim 9,
wherein said ending processing includes a completing processing for the current erasure/write processing for a non-volatile memory cell.

11. A semiconductor processing system, comprising:
a plurality of external terminals, each of which is attachable/detachable to/from its corresponding terminal of an external apparatus;
a first processing circuit coupled to said plurality of external terminals;
a second processing circuit controlled by said first processing circuit; and
a resistance element used for connection between a first external terminal and a second external terminal among said plurality of external terminals,
wherein said first external terminal receives a first voltage when said second processing circuit is active,
wherein said second external terminal receives a second voltage, and
wherein said first processing circuit, when the system is removed from said external apparatus, detects a voltage change from said first voltage to said second voltage at said first external terminal before power supply from the external apparatus is disconnected from said second external terminal, then executes a processing in response to the detected voltage change.

12. The semiconductor processing system according to claim 11,
wherein said first external terminal is a reset terminal that receives a first voltage after a reset instruction is completed.

13. A semiconductor processing system, comprising:
a plurality of external terminals, each of which is attachable/detachable to/from its corresponding terminal of an external apparatus;
a first processing circuit coupled to said plurality of external terminals;
a second processing circuit controlled by said first processing circuit; and
a resistance element used for connection between a first external terminal and a second external terminal among said plurality of external terminals,
wherein said first external terminal is one of a plurality of ground terminals,
wherein said second external terminal is a power supply terminal, and
wherein said first processing circuit, when the system is removed from said external apparatus, detects a voltage change from a ground voltage to a supply voltage thereof at said first external terminal before power supply from the external apparatus is disconnected from said second external terminal, then executes a processing in response to the detected voltage change.

14. The semiconductor processing system according to claim 13,
wherein said first external terminal is disposed so as to be disconnected from its corresponding terminal of said external apparatus earlier than other ground terminals when the system is removed from said external apparatus.

15. The semiconductor processing system according to claim 13,
wherein said second processing circuit includes a non-volatile volatile memory enabling information to be written/erased therein/therefrom electrically, and
wherein said first processing circuit is a control circuit for controlling both of said external interface and said non-volatile memory.

16. The semiconductor processing system according to claim 1, wherein said first and second external terminals have different lengths.

17. The semiconductor processing system according to claim 2, wherein said first and second external terminals have different lengths.

18. The semiconductor processing system according to claim 3, wherein said first and second external terminals have different lengths.

19. The semiconductor processing system according to claim 11, wherein said plurality of external terminals includes external terminals having different lengths.

20. The semiconductor processing system according to claim 13, wherein said plurality of external terminals includes external terminals having different lengths.

* * * * *